(12) United States Patent
Cherna et al.

(10) Patent No.: US 8,704,853 B2
(45) Date of Patent: Apr. 22, 2014

(54) MODIFYING GRAPHICAL PATHS

(75) Inventors: Tim Cherna, San Francisco, CA (US);
Nikhil Bhatt, Cupertino, CA (US);
Alexander David Wallace, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 740 days.

(21) Appl. No.: 12/619,418

(22) Filed: Nov. 16, 2009

(65) Prior Publication Data
US 2011/0050706 A1    Mar. 3, 2011

Related U.S. Application Data

(60) Provisional application No. 61/237,185, filed on Aug. 26, 2009.

(51) Int. Cl.
*G09G 5/00*      (2006.01)
*G08G 1/123*      (2006.01)

(52) U.S. Cl.
USPC ..................................... 345/629; 340/995.14

(58) Field of Classification Search
None
See application file for complete search history.

(56) References Cited

U.S. PATENT DOCUMENTS

| | | | | |
|---|---|---|---|---|
| 6,904,160 | B2* | 6/2005 | Burgess | 382/113 |
| 6,906,643 | B2* | 6/2005 | Samadani et al. | 340/995.18 |
| 8,169,505 | B2* | 5/2012 | Hoshi | 348/231.3 |
| 2004/0217884 | A1* | 11/2004 | Samadani et al. | 340/995.14 |
| 2004/0220965 | A1* | 11/2004 | Harville et al. | 707/104.1 |
| 2007/0176796 | A1* | 8/2007 | Bliss et al. | 340/995.14 |
| 2007/0258642 | A1* | 11/2007 | Thota | 382/173 |
| 2009/0284551 | A1* | 11/2009 | Stanton | 345/629 |
| 2010/0091011 | A1* | 4/2010 | Arrasvuori | 345/418 |

OTHER PUBLICATIONS

Kentaro Toyama, Ron Logan, and Asta Roseway. 2003. "Geographic location tags on digital images". In Proceedings of the eleventh ACM international conference on Multimedia (MULTIMEDIA '03). ACM, New York, NY, USA, 156-166.*

* cited by examiner

*Primary Examiner* — Ryan R Yang
(74) *Attorney, Agent, or Firm* — Fish & Richardson P.C.

(57) ABSTRACT

A computing device includes a memory configured to store images and associated timing data. The computing device also includes a processor configured to execute instructions to perform a method that includes producing a graphical path on a digital map that represents positions associated with the images. The positions are estimated from the timing data associated with the images. The method also includes modifying the graphical path based upon data that represents user provided adjustments to the estimated positions of the images. The method also includes presenting the modified path.

33 Claims, 9 Drawing Sheets

MODIFYING GRAPHICAL PATHS

CLAIM OF PRIORITY

This application claims priority under 35 USC §119(e) to U.S. Provisional Patent Application Ser. No. 61/237,185, filed on Aug. 26, 2009, the entire contents of which are hereby incorporated by reference.

BACKGROUND

This disclosure relates to a system for generating and modifying graphical paths representing locations associated with images.

In the expanding fields of personal computing and electronic devices, more and more features and functionality are being incorporated into portable devices. For example, cellular telephones may include cameras (for gathering images and video) and high resolution displays (for presenting various types of imagery and graphics) while still providing telecommunication functions (e.g., for placing and receiving telephone calls). Due to their robust processing and computational resources, such devices may provide various functions for professional and recreational applications. As such, data (e.g., images and video) may be collected and processed for presentation and storage.

SUMMARY

Disclosed herein are systems and methods for developing paths of position data from time data and a collection of images. For example, a series of time-stamped images collected by a portable computing device such as a cellular phone may be used to produce a graphical representation of a traveled path. Once produced, the representation of the path may be modified, for example, by introducing additional images that are associated with locations near the traveled path. Further, information provided by a viewer that reflects adjustments in the traveled path may also be used for path modifications.

In some implementations, a computing device includes a memory configured to store images and associated timing data. The computing device also includes a processor configured to execute instructions to perform a method that includes producing a graphical path on a digital map that represents positions associated with the images. The positions are estimated from the timing data associated with the images. The method also includes modifying the graphical path based upon data that represents user provided adjustments to the estimated positions of the images. The method also includes presenting the modified path.

In other implementations, a method includes producing a graphical path on a digital map that represents positions associated with images. The positions are estimated from timing data associated with the images. The method also includes modifying the graphical path based upon data that represents user provided adjustments to the estimated positions of the images. The method also includes presenting the modified path.

In other implementations, one or more computer readable media store instructions that are executable by a processing device, and upon such execution cause the processing device to perform operations that include producing a graphical path on a digital map that represents positions associated with images. The positions are estimated from timing data associated with the images. The operations also include modifying the graphical path based upon data that represents user provided adjustments to the estimated positions of the images. The operations also include presenting the modified path.

These and other aspects and features and various combinations of them may be expressed as methods, apparatus, systems, means for performing functions, program products, and in other ways.

Other features and advantages will be apparent from the description.

DESCRIPTION OF DRAWINGS

FIG. 4(a) and (b) illustrate adjusting associations between estimated position data and images.

Like reference symbols in the various drawings indicate like elements.

DETAILED DESCRIPTION

Figure 1:
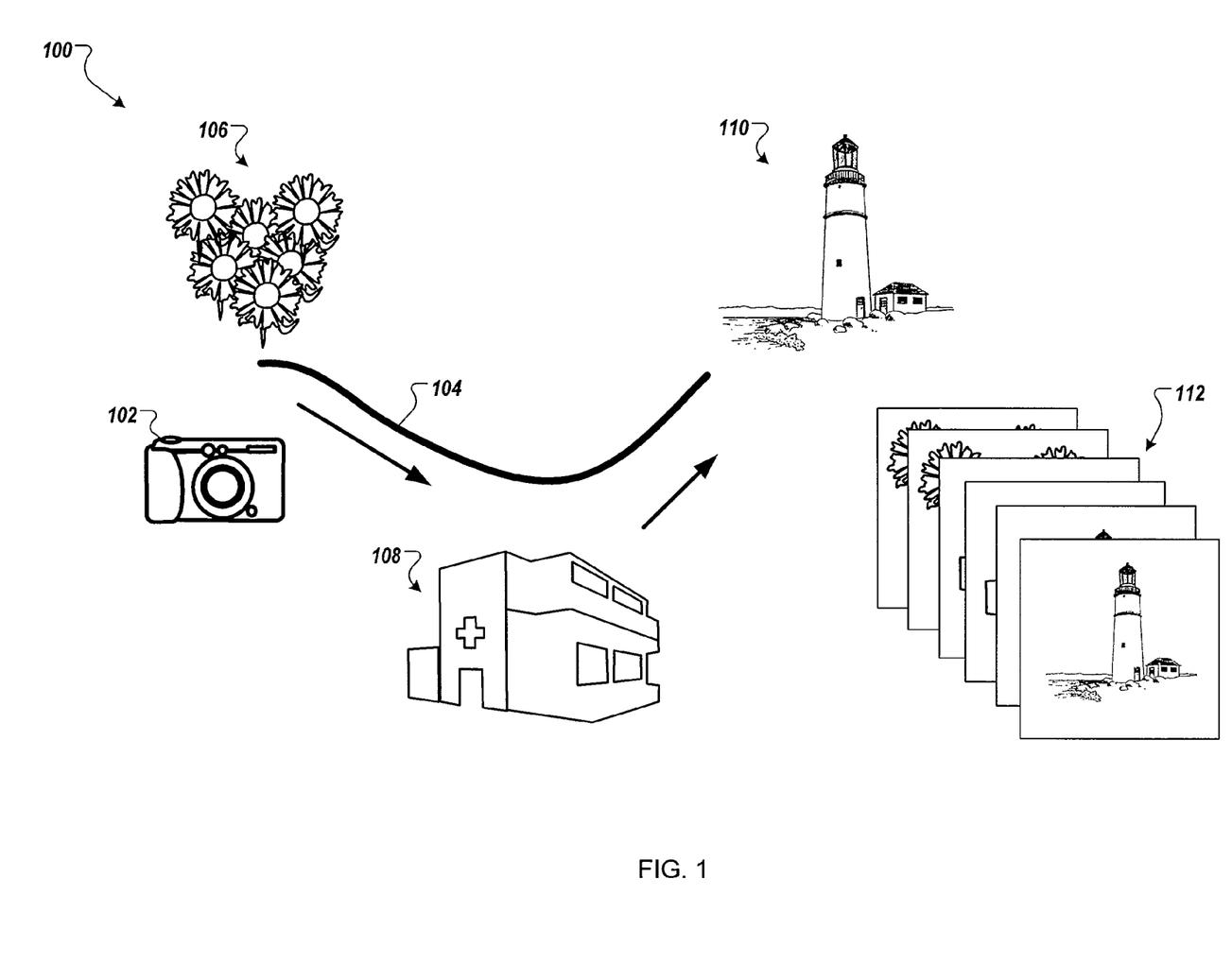
FIG. 1 illustrates a path traveled by an individual with a portable camera.

Referring to FIG. 1, an illustration 100 shows a series of exemplary scenes that may be experienced by an individual while traveling along a path. By carrying a portable computing device such as a cellular telephone, a personal digital assistant (PDA) or other similar device, information about the path followed by the individual may be recorded. In this example, an individual carries portable camera 102 that is capable of collecting images while progressing along path 104. Along with collecting images, additional information may be collected by camera 102. For example, similar to other portable computing devices, camera 102 may include an internal clock that may note the time and date at each instance an image is captured. In some arrangements, the time and date information is grouped with the corresponding image (e.g., a time-stamp is applied). Other types of data may also be collected as images are captured (or during other time instances), for example, parameters associated with the camera (e.g., serial and model number), collection parameters (e.g., image resolution) and other similar information may be collected.

For illustration, while progressing along path 104, the individual passes through a park (represented by flowers 106) that may provide various rural scenes of the local nature. Stopping along the way, images of the flowers 106 may be collected using the camera functionality of camera 102. Along with collecting the images, time and date information is collected and grouped (e.g., time-stamped) with the respective image. As the individual continues to travel (and carry camera 102), additional images may be captured and grouped with timing data. For example, at approximately the midpoint of the traveled path 104, the individual may pass through an urban area (e.g., represented by a hospital 108). Similarly, the individual may pause and capture one or more images of these surroundings. Continuing on, the individual may conclude the trip by stopping at a seaside location 110 (in this particular example). As with the other locations experienced, images may be captured of the seaside along with timing data (e.g., that corresponds to the capture day and time). In this particular example, individual images (e.g., photographs) are described as being collected, however, other types of imagery (e.g., video) may also be collected with camera 102 at such locations.

At the conclusion of the travel, significant amounts of information may be stored in camera 102. For example, the captured images 112 and the corresponding day and time stamps may be stored in memory on board camera 102. In addition to providing sights experienced along path 104 (from the images), the stored information can also be used to estimate the traveled path of the individual. For example, images that have been captured proximate in time are likely to have been taken at the same location or nearby locations. Correspondingly, images captured several minutes or hours apart are likely to have been taken at different locations. As such, the timing information associated with the images can be used to track the traveled path. Further, by using one or more of the images, reference points may be established and assist with transforming the timing information into position information, which can be used to represent the traveled path 104 on a graphical representation such as a digital map.

Various techniques may be implemented to transform the timing data. One or more reference points may be established by using one or more images that are associated with a known location. Such a reference point (typically multiple reference points) may be used to estimate position information associated with other images. For example, two or more of the images may be associated with particular locations represented on a digital map (or other type of graphical representation). From the corresponding map locations, one or more paths between the locations may be calculated (e.g., using estimation techniques) to represent the distance covered by the individual (e.g., who captured the images). One or more techniques may be used to establish such reference points. For example, a group of images associated with similar capture times may be indicative of a common location that may serve as a reference point. A group of images may also be associated with a particular location (e.g., a waypoint) provided by a position identifying device (e.g., a global positioning system (GPS) device).

Figure 2:
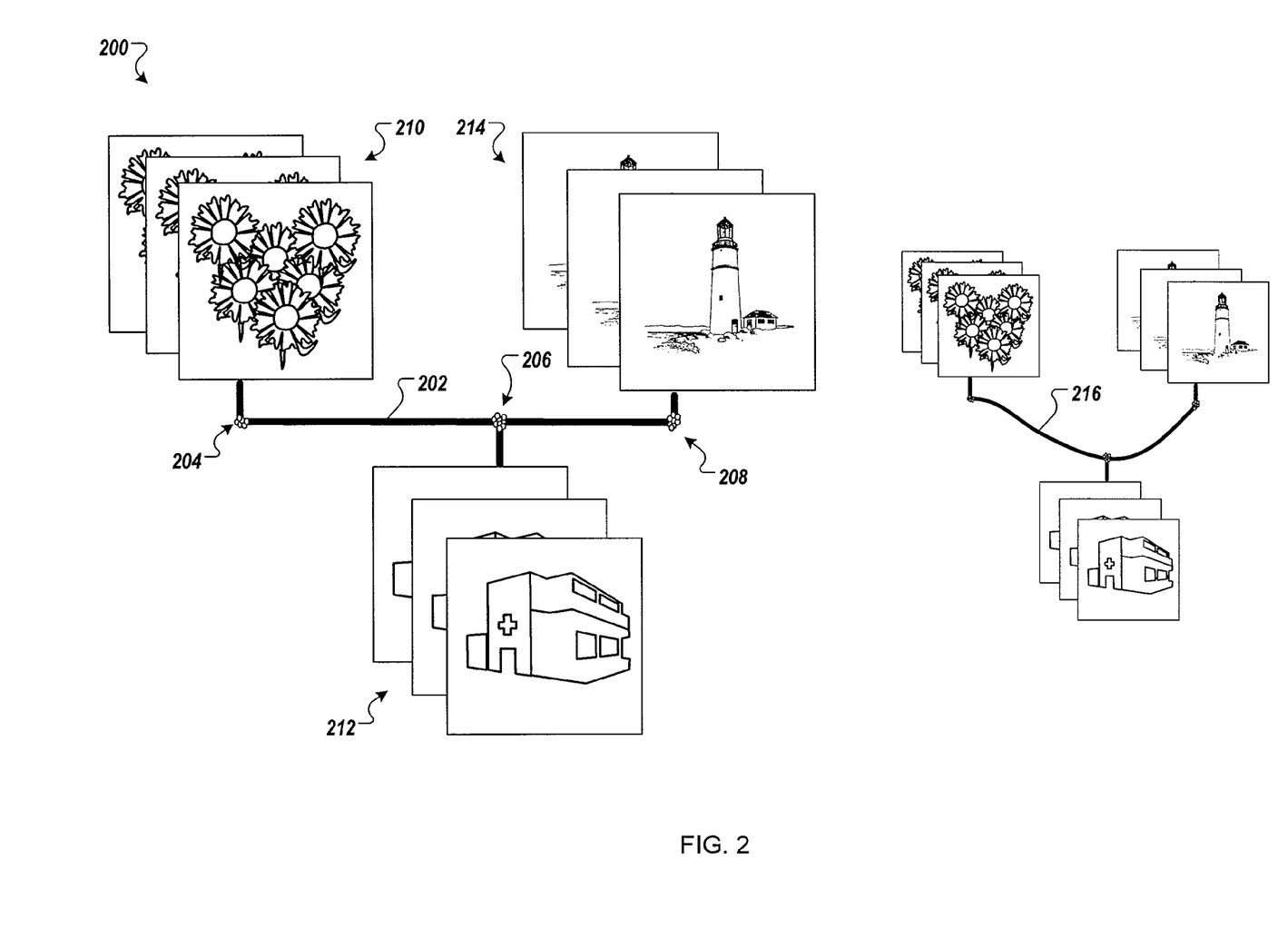
FIG. 2 illustrates images associated with a tracked path.

Referring to FIG. 2, a graphical representation 200 illustrates the combining of estimated position data (e.g., approximate locations based on timing data) and captured images. In this particular example, the estimated position data is represented by a series of data points that extend along a line 202. As often occurs, an individual pauses while taking photographs at locations of interest. However, while pausing, timing data typically continues to be collected with each photograph. Several photographs taken in succession at a pause location can have time stamps showing that they were taken within a relatively short timeframe, e.g. within a few seconds of each other. These photographs can be assumed to have been taken at the same or nearby location. As such, the estimated position data may appear to group around the location where the individual pauses. In this particular example, three groups of position data 204, 206, 208 respectively corresponds to three locations where the individual paused to capture images with camera 102. Multiple images (e.g., images 210, 212, 214) are represented as being captured at each of the three locations from the time stamps associated with each respective image. For the implementation in which waypoints establish reference points, each group of images may be associated with relatively few or a single position data point.

By associating the respective groups of captured images with the appropriate position data groupings, the path traveled by the individual may be represented along with imagery experienced by the user. Since the timing data is scalar, the groups of position data 204, 206, 208 are separated along the line 202. However, direction may be incorporated into the separated position data by modifying the line 202. For example, one or more reference points may be added (e.g., from user interaction), or other modification techniques may be applied to the position data. Once modified, the particular path traveled (e.g., path 104), as illustrated by path 216, may be represented for presentation. For the implementation in which waypoints are associated with groups of images, directional information may be provided by the two or three dimensional coordinates associated with the waypoints.

Figure 3:
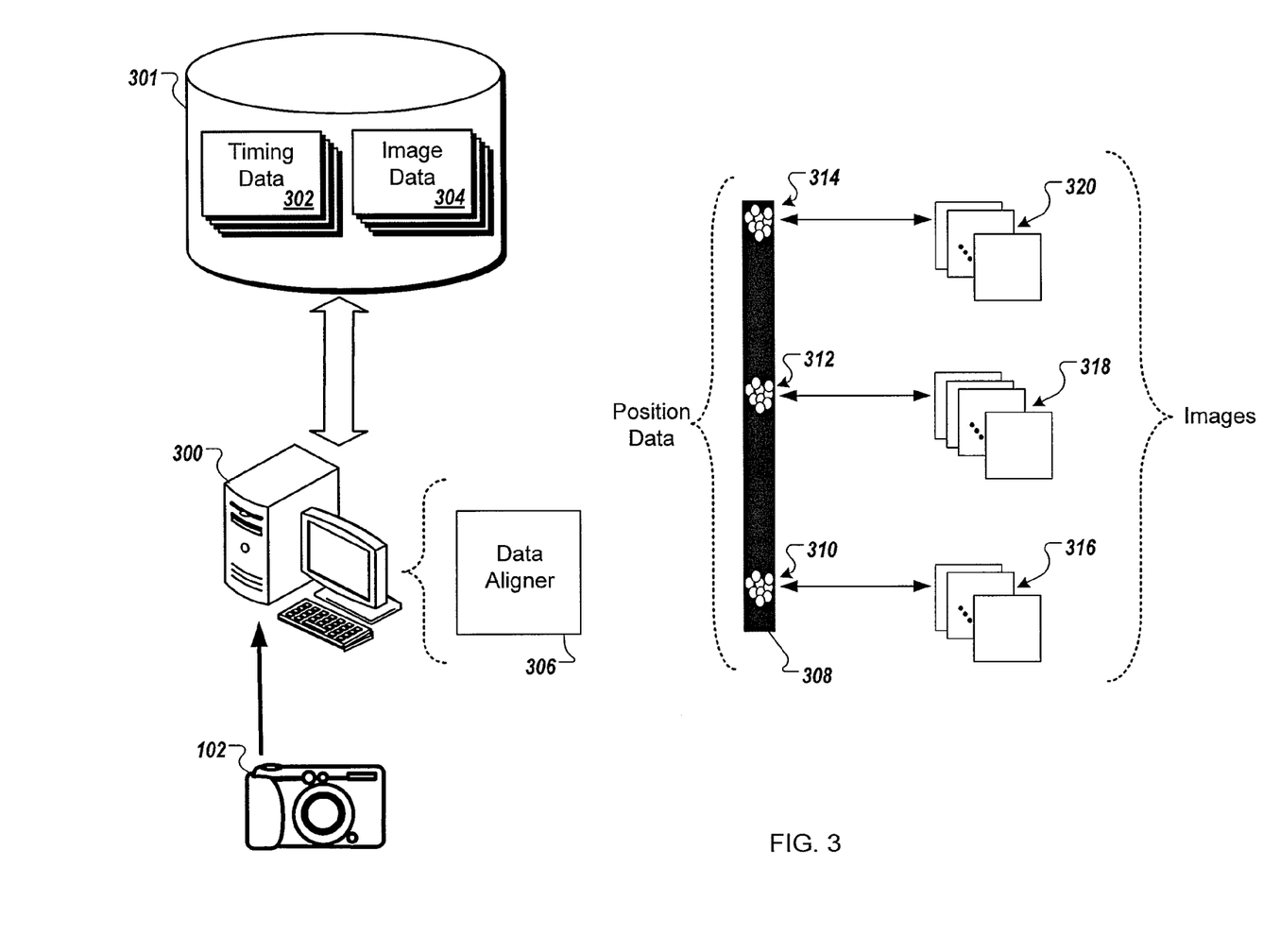
FIG. 3 illustrates a system for estimating position data.

Referring to FIG. 3, camera 102 is capable of providing (e.g., uploading, etc.) the collected data (e.g., timing data, images) to a computing device such as a computer system 300 for processing, presenting and storage. For example, the data may be stored in memory 301 that uses one or more storage techniques (e.g., random access memory (RAM), static RAM (SRAM), dynamic RAM (DRAM), etc.). In some implementations, memory 301 may include one or more types of storage devices (e.g., a hard drive, CD-ROM, etc.) for storing the timing and imagery data. While memory 300 is illustrated as storing both timing data 302 and images 304, in some arrangements this content may be stored in a distributed manner by using multiple memories. Also, while computer system 300 is illustrated as processing the timing and image data, in some arrangements the data may be provided (e.g., transferred, uploaded, etc.) to other types of computing devices (e.g., a computer system) or may be processed on board camera 102 for presentation.

To determine estimated position data from the timing data associated with the images, computer system 300 (or other computing device) is used in conjunction with data aligner 306. In general, data aligner 306 identifies one or more groups of timing data (e.g., time stamps) that can be used to indicate the locations associated with one or more images (e.g., where an individual carrying the cell phone may have paused to capture the images). For the situation in which waypoint data is provided (e.g., from a GPS device), data aligner 306 may be used to associate one or more images with each waypoint (e.g., user interaction may assist defining the associations).

Once identified, images are correspondingly aligned with position data that is estimated from the timing data (or provided by the waypoints). The estimated position data and information that relates the images to the position data may be stored for later retrieval and use. For example, the data may be used to create a graphical representation of the aligned estimated position data and images, thereby allowing the user to review the track of the path followed and the images collected while traveling the path. Such graphical representations may also be produced by another computing device (e.g., a computer system) from the data stored on camera 102. Further, while camera 102 is used in this example for image capture, in some arrangements, other devices (e.g., a camera) may be used for collecting images.

One or more techniques may be implemented by data aligner 306 to estimate position data and align the data with captured images. For example, images taken at approximately the same time can be estimated as being associated with approximately the same location. Also, times differentials (e.g., time stamp differences) that exceed a predefined threshold (e.g., a few minutes) may be considered as indicating that the corresponding images are associated with separate locations. As such, images associated with proximate locations may be grouped.

In this particular arrangement, to form associations between position data and images, processing of the timing data may be segmented. For example, timing data associated with relatively short segments (e.g., one hour) may be processed to increase the probability that the images are aligned with the appropriate position data. For example, to appropriately process groups of images captured during a short period of time, relatively short segments of timing data may be processed. However, in some instances (e.g., relatively few images captured over a long time period) extended periods of timing data may be processed.

As illustrated in the figure, segment 308 contains data points that represent the estimated position data (e.g., that correlates to movements of camera 102 during a period of time). Within segment 308, three groups of estimated position data 310, 312, 314 represent three respective instances that the individual carrying cell phone 102 may have paused (e.g., to capture some images), based on the timing information associated with images 316, 318, 320. As such, one or more captured images may be associated with each of the groups of position data. To determine such associations, data aligner 306 may compare date and time data between captured images to generate the estimated position data. In this example, data aligner 306 determines that images 316 have been taken at approximately the same time and are associated with the same approximate location. Similarly, data aligner 306 may determine that date and time information associated with image groups 318 and 320 corresponding align with position data groups 312 and 314. Situations may occur in which timing data associated with one or more images does not appear to be appropriate (e.g., due to clock malfunction, etc.). In such instances, data aligner 306 may decide not to align such images with position data (associated with a segment).

Along with not assigning one or more images to a segment, data aligner 306 may perform other operations associated with alignment. For example, upon aligning one or more images (e.g., image group 318) with estimated position data (e.g., position data group 312), alignments may be adjusted (e.g., based upon user input). In one situation user input may manually identify one or more images (e.g., image group 318) and the position data (e.g., position data group 314, waypoint data) to which the images should be associated. As such, the image and position data alignments may be rearranged by a user. Based upon such manual adjustments and input, data aligner 306 may rearrange the image and data position assignments. For example, after a user has directed an image and position data pair assignment, data aligner 306 may accordingly shift other assignments (e.g., assign image group 316 to position data group 312). Assignments may be shifted in various directions by data aligner 306 based upon the user input or other types of trigger events. Other operations of data aligner 306 may also include combining image groups or separating one or more images from an image group.

Figure 4:
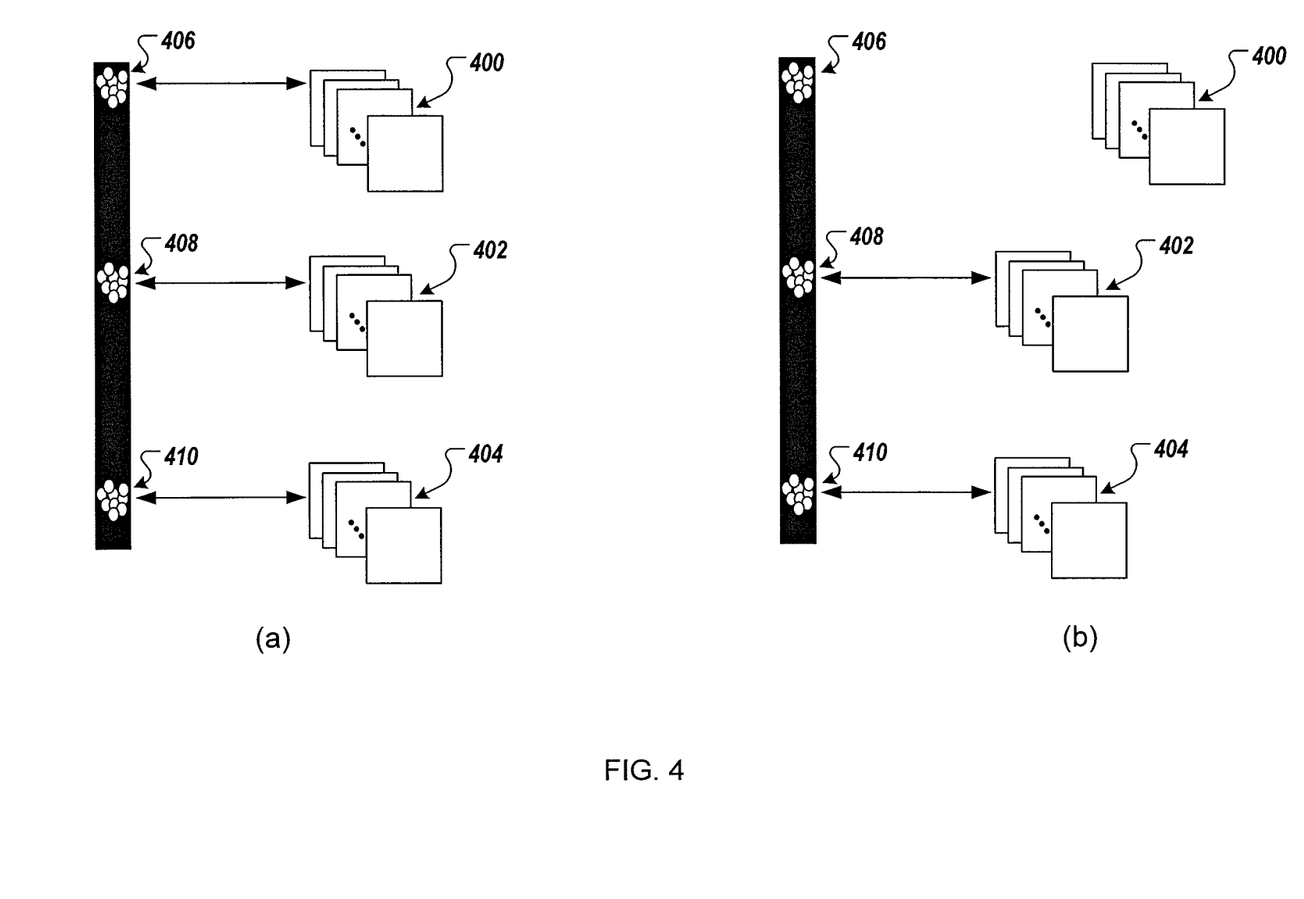

Referring to FIG. 4(*a*), alignment operations provided by data aligner 306 may include removing one or more assignments between estimated position data and images. For example, based upon date and times associated with images, data aligner 306 may respectively assign image groups 400, 402 and 404 to position data groups 406, 408 and 410. Upon presenting the alignment of the images and position data, a user may identify that one or more images are incorrectly assigned to a location. For example, image group 400 (e.g., pictures of an urban scene) may not correspond to position data group 406 (e.g., estimated position coordinates corresponding to a seaside location). As such, a user may direct data aligner 306 is remove the association between image group 400 and position data group 406, as illustrated in FIG. 4(*b*). Upon being removed, image group 400 may be associated with another position data group (e.g., to indicate the correct capture location associated with the images). Such alignment adjustments may be initiated by data aligner 306 or based upon user interaction (e.g., with computer system 300). In some arrangements, the alignment of other images and position data is unaffected by the removal of an image/position data association. For example, while the association between image group 400 and position data group 406 may be removed, the other associations (e.g., image group 402 and position data group 408, and, image group 404 and position data group 410) may remain in the alignment. Similarly, in some arrangements one or more image and position data associated may be added to an alignment such that previous associations among other images and position data is unaffected.

Figure 5:
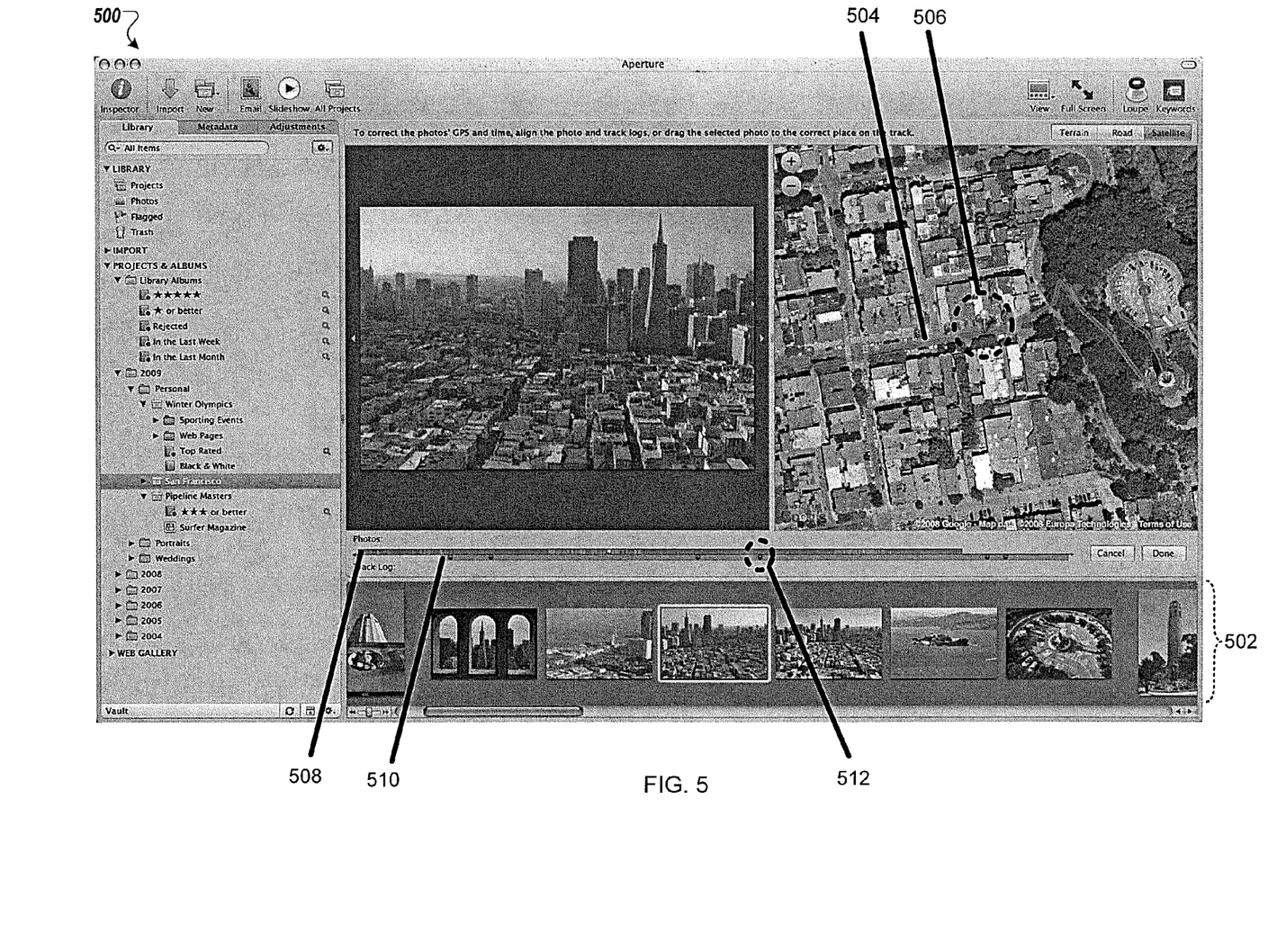
FIG. 5 illustrates a graphical user interface.

Referring to FIG. 5, an exemplary user interface 500 illustrates an alignment among images and position data. In this arrangement, a series of images 502 are presented in user interface 500 along with a graphical representation 504 of the position data (estimated from the time stamps of each of the images) that tracks an individual traveling through an urban area. To assist the viewer and to provide context, the graphical representation 504 overlays a digital map of the urban area. To indicate an association between a position data group and an image, a graphical pin 506 is illustrated (along the graphical representation 504) that represents the location where the image was captured. By adjusting the location of graphical pin 506, the image/position data association may be adjusted, for example, removing graphical pin 506 may remove the association between the images and the position data. The graphical pin 506 can also be used to identify a known location associated with one or more images (e.g., the image capture location, a waypoint, etc.). Such a location may provide a reference location from which the locations of the other images can be estimated based on the time stamps of those images. Similarly, an image may be selected from the series of images 502 and placed (e.g., dragged) to a particular location on the graphical representation 504 of the position data to form an association, e.g., if the location cannot be correctly estimated from the date and time information. Adjustments may also be initiated by shifting a graphical bar 508 that represents the sequence of the images (and the corresponding times associated with the images). Adjustments may also be initiated by shifting a graphical bar 510 that represents the estimated position data, or by shifting both graphical bars 508 and 510. In this arrangement, graphical bar 510, which represents the position data, includes data points 512 that represent groups of position data that indicate possible pauses in movement of the tracked individual based on the time stamps of images and their estimated location. Other types of graphical representations may also be incorporated into user interface 500 for illustrating information associated with the position data and associated images. For example, color and color level changes may be used to represent the velocity and/or direction of the individual being tracked, and can be manipulated by the user to adjust the accuracy of the estimated position data. Additionally, changes in color (and other graphical effects) may be used to contrast portions of a map (to which position data is overlaid). For example, as the position data transitions from an urban area to a rural or seaside area, colors used to represent the position data may be changed.

Figure 6:
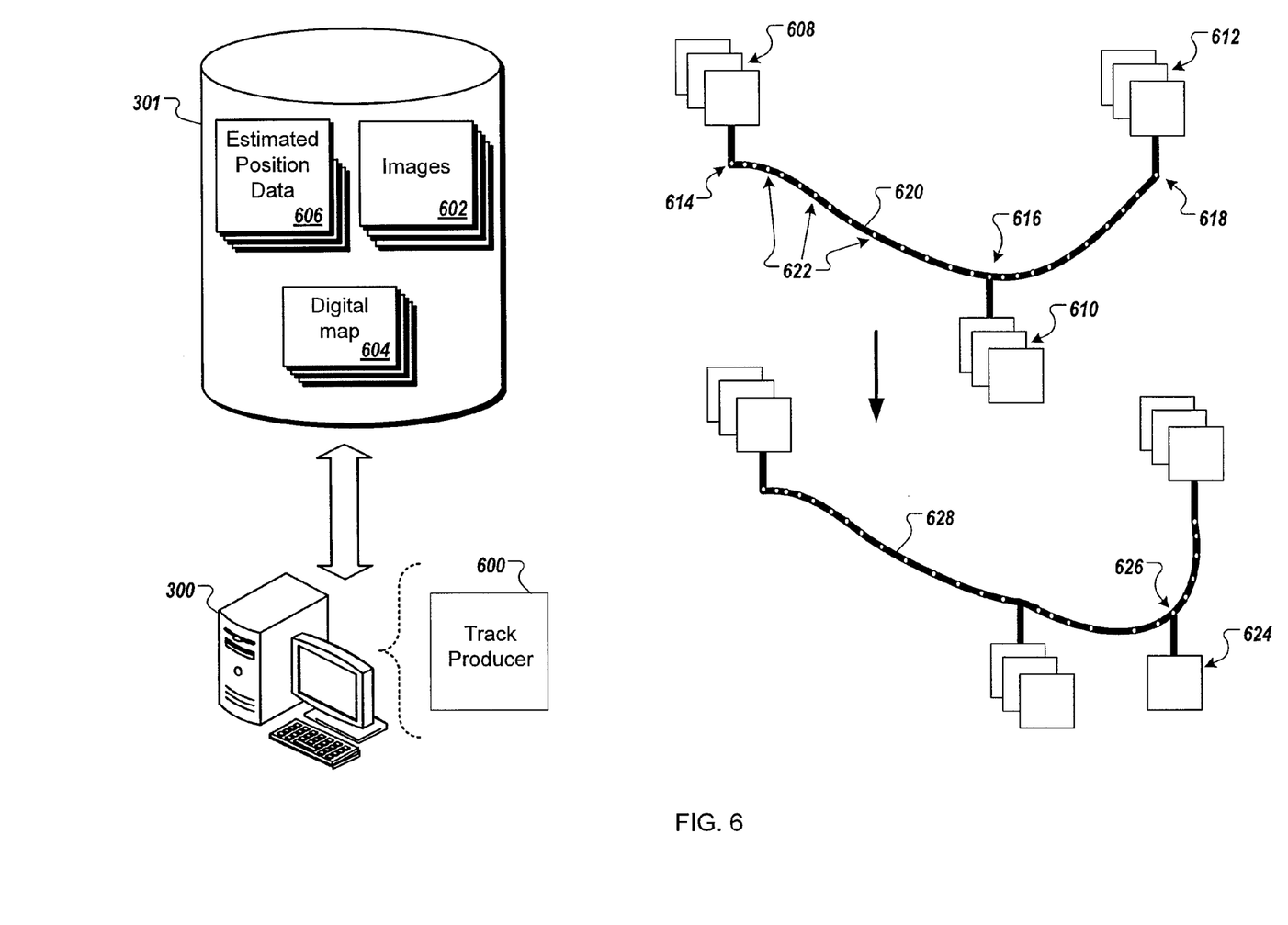
FIG. 6 illustrates a system for producing and modifying representations of a path.

Referring to FIG. 6, one or more activities may be used to adjust associations between position data and images. For example, one or more captured images may be used to establish reference points e.g., for estimated position data associated with the images and other images. Various techniques may be used to create such anchor points with one image or multiple images. For example, a user may interactively associate an image with a particular location (e.g., drag an image onto a particular location of a representation of a map). By also associating a location point (on a digital map representation) with estimated position data associated with an image, the image may provide an anchor point. Further, by associating two or more images with respective map locations, multiple anchor points may be established. For illustration, a first image may be associated with one map location (e.g., a park) and another image associated with another map location (e.g., the seaside). By establishing these two anchor points, the estimated position data of these images and other images may be adjusted to account for the additional information (e.g., direction changes, etc.) and may be presented in the graphical representation of the path overlaying the digital map. Similarly, waypoints and other types of position data may be adjusted based upon user interaction.

As illustrated in the figure, computer system 300 executes a track producer 600 to determine the travel paths between multiple locations associated with images (and adjustments to the paths). To perform such operations, various types of data may be used by track producer 600. For example, along with images 602, a digital representation (e.g., a digital map 604) that includes the locations associated with the images and general vicinities may be used by track producer 600. Additionally, track producer 600 may use estimated position data 606 (e.g., produced from image time stamps) for determining the traveled paths. In this particular arrangement, digital map 604, images 602 and estimated position data 606 are represented as being stored at a single storage location (i.e., memory 301). However, in some implementations that data may be stored in a distributed manner across multiple locations that may or may not include memory 301. Further, this data may be provided (e.g., transferred, uploaded, etc.) for processing and presentation by another computing device (e.g., a computer system).

Based upon the data provided and one or multiple anchor points, track producer 600 may determine points on digital map 604 that represent the locations associated with images 602 (e.g., capture locations). As illustrated, groups of images 608, 610 and 612 are respectively associated with anchor points 614, 616 and 618 that correspond to locations included in digital map 604. Various techniques may be implemented to form such associations, for example, digital map 604 may be presented in a graphical user interface (e.g., such as GUI 500 shown in FIG. 5). Once presented, each of the anchor points 614, 616, and 618 may be selected by graphically dragging the respective image (or images) onto the corresponding location of the map. Drop down menus that highlight points of interest on the digital map, or other techniques may also be used to form the associations. Estimated position data 606 may also be used by track producer 600 to form associations between images 602 and locations of digital map 604. From the anchor point or points, the relative positions provided by estimated position data 606 may associate images with other locations of digital map 604.

Once the images are associated with locations of digital map 604, one or more techniques (e.g., estimation, interpolation, etc.) may be used by track producer 600 to determine paths between the locations associated with the images. In this example, map coordinates associated with anchor points 614, 616, and 618 and estimated position data 606 may be used by track producer 600 to calculate a graphical path 620 (e.g., that represents the path traveled to capture images 608, 610 and 612). From the operations executed in this example (e.g., estimation, interpolation, etc.), a series of data points 622 are produced with coordinates that provide path 620. Along with the amount of data points produced to represent path 620, track producer 600 may be used to control other parameters associated with the path (e.g., starting point, ending point, direction traveled, etc.) from information provided by a GUI or another information source (e.g., data stored in memory 301).

Along with producing paths that reflect a traveled path, track producer 600 may adjust the produced paths based upon information from one or more sources. For example, the location or locations associated with additional images (e.g., capture locations, waypoints, etc.) may be introduced. Based upon these location(s) of the additional images, track producer 600 may adjust the path. To illustrate such an adjustment, image 624 is considered to have been captured while path 620 was traveled. To introduce image 624, a user may interact with a GUI by dragging image 624 to a location (e.g., represented by point 626) along path 620 that corresponds to the capture location of the image. In another example, estimated position data 606 may provide the location that image 624 was captured. Based upon the introduction of image 624, track producer 600 may update path 620 such that location point 626 is included in the path. For example, one or more operations (e.g., estimation, interpolation, etc.) may be executed on the points defining path 620 (including newly added point 626). Once calculated, an updated path 628 may be presented in the GUI (e.g., similar to GUI 500). In this particular update example, the shape of path 628 in the vicinity of point 626 is noticeably different than the shape of the corresponding area in path 620. Along with providing path adjustments based upon additional images being associated to a path, other events may also initiate updating a path.

Figure 7:
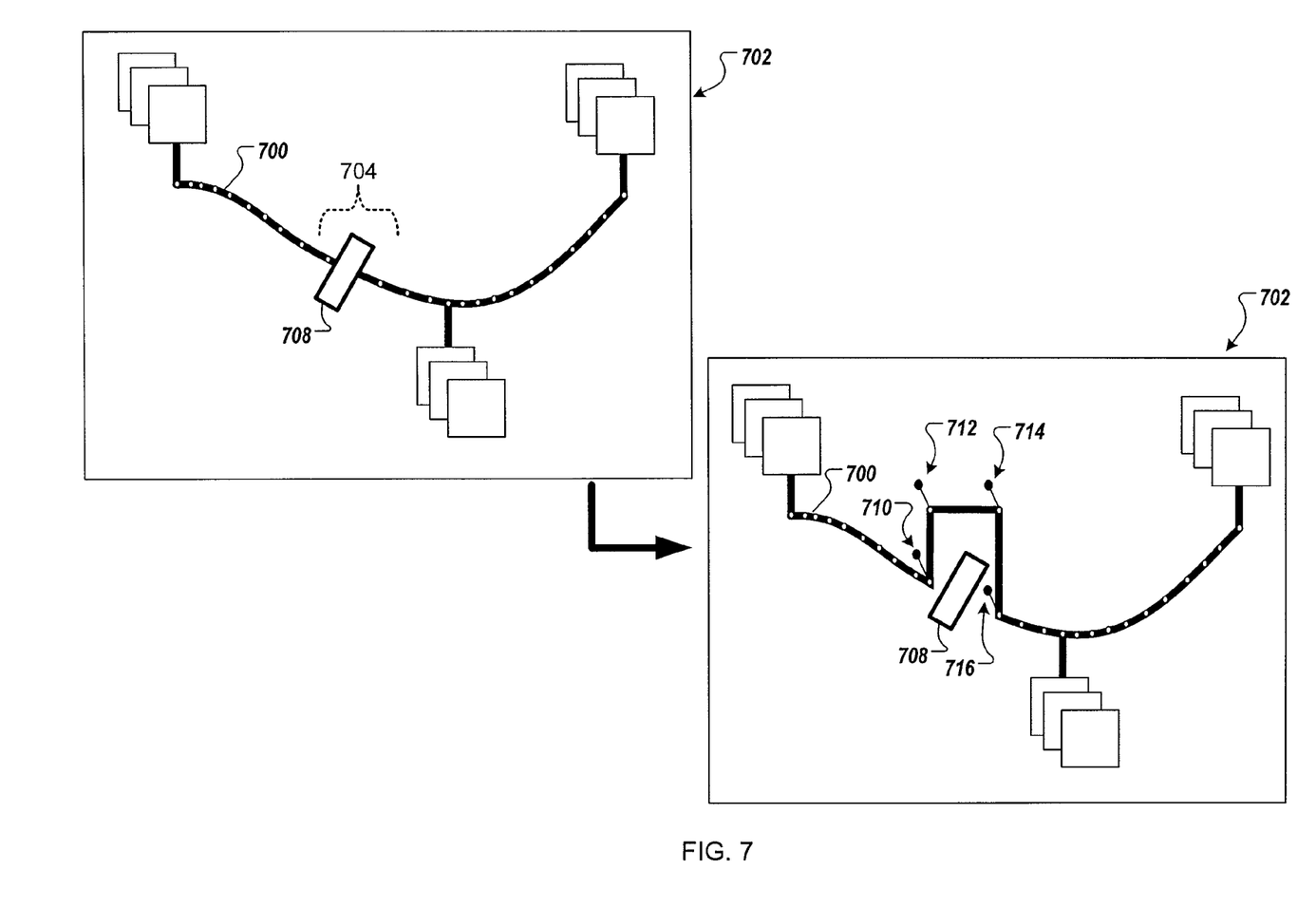
FIG. 7 illustrates modifications to a representation of a path.

Referring to FIG. 7, track producer 600 may also modify paths based upon user provided information. For example, by laying a calculated path 700 over a digital map 702 (or other similar digital representation), the content of the map may cause a user to edit the path. To illustrate, a portion 704 of path 700 is shown passing through a rectangular shape 708 that represents a building included in map 702. Upon viewing, a user may realize that path portion 704 was not traveled and path 700 is incorrectly portrayed with respect to the content of digital map 702 (e.g., building 708). Often such contradicting data can be explained, for example, data representing the path traveled by the individual may be incorrect. In one scenario, data representing path 700 may have been produced from estimated position data and one or a few anchor points that may inadvertently not account for building 708.

By allowing a user to edit paths, adjustments may be provided by tracker producer 600 to account for discrepancies between produced paths and the actual path traveled. In this particular, example, by interacting with a GUI (e.g., such as GUI 500 shown in FIG. 5) a user can provide additional position data to address discrepancies reflected in portion 704 of path 700. To represent the actual traveled path, the user may add one or more selectable pins to serve as anchor points such that appropriate data is provided to track producer 600 for adjusting the path. In the illustrated adjustment, four selectable pins 710, 712, 714 and 716 are positioned by the user to identify the path traveled around building 708. Additional information may also be provided by the user that describes the adjusted path. For example, the particular direction traveled, or a change in direction traveled, may be identified by the user. In one arrangement, direction may be identified from the sequence that the pins are introduced (e.g., dragged and positioned onto map 702). For example, first pin 710 may be graphically inserted into path 700, next pins 712 and 714 are introduced. To complete the path adjustment, pin 716 is inserted into path 700 to identify the reconnection point with path 700. Along with this technique, track producer 600 may also implement similar techniques for performing other adjustment operations such as appending, adding and deleting paths and path segments. Additionally, track producer 600 may control which path adjustments may be accepted and which may be denied. For example, based upon predefined rules, track producer 600 may grant some user provided path adjustments while blocking adjustments in other instances.

Figure 8:
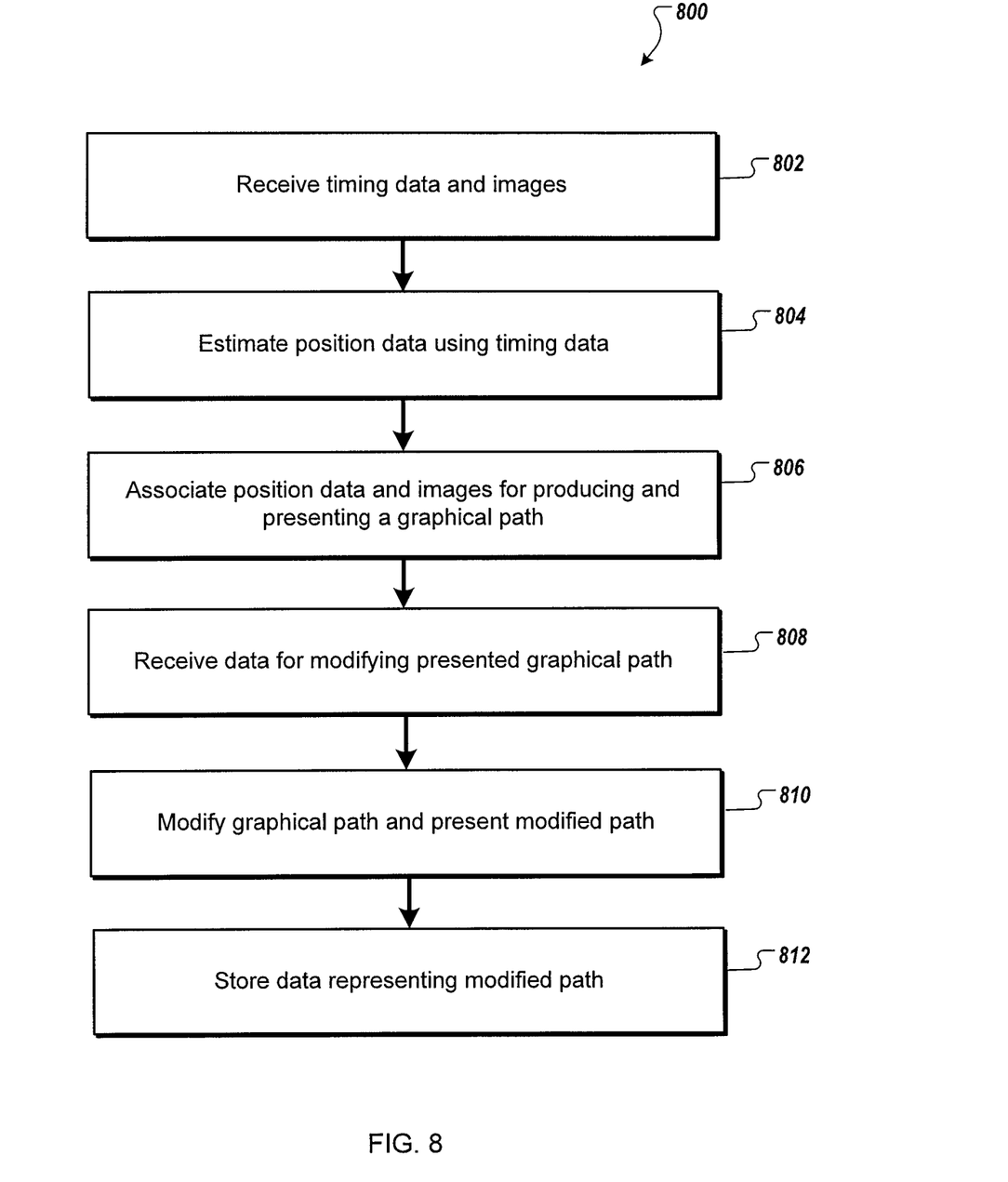
FIG. 8 is a flowchart that represents operations of a track producer.

Referring to FIG. 8, a flowchart 800 represents some of the operations of data aligner 306 (shown in FIG. 3) and track producer 600 (shown in FIG. 6). In some implementations, operations of data aligner 306 and track producer 600 are executed separate, while in other implementations some operations may be jointly executed. The operations may also be executed by a single computing device (e.g., computer system 300, etc.) or multiple computing devices. Operations may include receiving 802 timing data and images. As mentioned above, timing data may include date and time associated with each image (e.g., time stamps associated at image capture). Operations also include estimating 804 position data using the timing data, e.g., by using techniques to approximate the location associated with each image based on its time stamp and one or more reference points. Operations also include associating 806 the image and the estimated position data to produce a graphical representation of a path. For example, as illustrated in FIG. 5, the imagery and position data may be presented in a GUI. Once presented, a viewer may decide whether the graphically represented path should be modified and may interact with the GUI to provide the needed adjustments. Correspondingly, operations include receiving 808 data for modifying the presented graphical path. Along executing operations for modifying 810 the graphical path, operations may include presenting the modified path, e.g., for further review by the viewer. Once the modified path is presented, other operations may be provided. For example, operations may include storing 812 data that represents the modified path.

Figure 9:
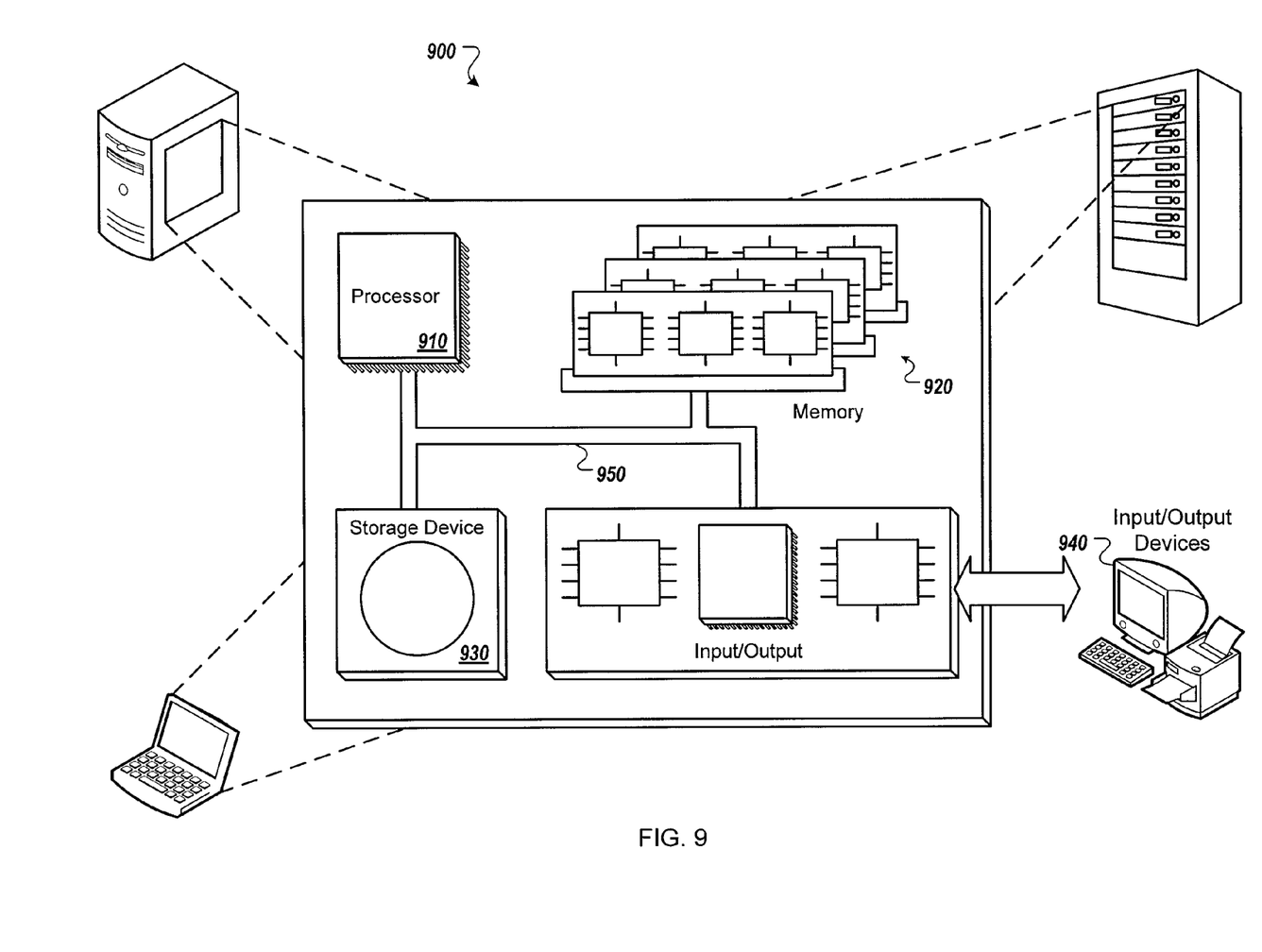
FIG. 9 represents a computer system and related components.

Referring to FIG. 9, a schematic diagram of a generic computer system 900 is illustrated. The system 900 can be used for the operations described in association with any of the computer-implemented methods described previously, according to one implementation. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In some implementations, the memory 920 is a computer-readable medium. The memory 920 is a volatile memory unit in some implementations and is a non-volatile memory unit in other implementations.

The storage device 930 is capable of providing mass storage for the system 900. In one implementation, the storage device 930 is a computer-readable medium. In various different implementations, the storage device 930 may be a floppy disk device, a hard disk device, an optical disk device, or a tape device.

The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims. For example, the techniques described herein can be performed in a different order and still achieve desirable results.

The invention claimed is:

1. A computing device comprising:
   a memory configured to store images and associated timing data; and
   a processor configured to execute instructions to perform a method comprising:
   associating at least some of the images with position data, the position data being estimated from the timing data associated with each respective image, the estimation based at least in part on a distance traveled corresponding to an amount of time represented by the timing data;
   producing a graphical path on a digital map that represents the positions associated with the images;
   recalculating the association of at least some of the estimated positions and at least some of the images based upon user provided data indicating a position of at least one of the images;
   modifying the graphical path based upon the recalculated associations; and
   presenting the modified path.

2. The computing device of claim 1, wherein the positions associated with the images represent capture locations of the images and the timing data represents the capture time of the images.

3. The computing device of claim 1, wherein at least one estimated image position is associated with a location on the digital map.

4. The computing device of claim 1, wherein the data that represents the adjustment to the estimated positions of the images includes another image.

5. The computing device of claim 1, wherein the data that represents the adjustment to the estimated positions of the images includes an indication of a change in direction.

6. The computing device of claim 1, wherein the data that represents the adjustment to the estimated positions of the images includes data from a graphical user interface.

7. The computing device of claim 6, wherein a user-selectable graphical pin provides the data from the graphical user interface.

8. The computing device of claim 6, wherein the data from the graphical user interface represents a location on the digital map that corresponds to a location associated with another image.

9. The computing device of claim 1, wherein the data that represents the adjustment to the estimated positions of the images includes an indication that at least one of the images is associated with another location on the digital map.

10. The computing device of claim 1, wherein user interaction provides at least one of the positions associated with the images.

11. The computing device of claim 1, wherein a waypoint provides at least one of the positions associated with the images.

12. A method comprising:
    receiving images and timing data associated with the images;
    associating at least some of the images with positions, the positions being estimated from the timing data associated with each respective image, the estimation based at least in part on a distance traveled corresponding to an amount of time represented by the timing data;
    producing a graphical path on a digital map that represents the positions associated with the images;
    recalculating the association of at least some of the estimated positions and at least some of the images based upon user provided data indicating a position of at least one of the images;
    modifying the graphical path based upon the recalculated associations; and
    presenting the modified path.

13. The method of claim 12, wherein the positions associated with the images represent capture locations of the images and the timing data represents the capture time of the images.

14. The method of claim 12, wherein at least one estimated image position is associated with a location on the digital map.

15. The method of claim 12, wherein the data that represents the adjustment to the estimated positions of the images includes another image.

16. The method of claim 12, wherein the data that represents the adjustment to the estimated positions of the images includes an indication of a change in direction.

17. The method of claim 12, wherein the data that represents the adjustment to the estimated positions of the images includes data from a graphical user interface.

18. The method of claim 17, wherein a user-selectable graphical pin provides the data from the graphical user interface.

19. The method of claim 17, wherein data provided by the graphical user interface represents a location on a digital map.

20. The method of claim 12, wherein the data that represents the adjustment to the estimated positions of the images includes an indication that at least one of the images is associated with another location on the digital map.

21. The method of claim 12, wherein user interaction provides at least one of the positions associated with the images.

22. The method of claim 12, wherein a waypoint provides at least one of the positions associated with the images.

23. One or more non-transitory computer readable media storing instructions that are executable by a processing device, and upon such execution cause the processing device to perform operations comprising:
    receiving images and timing data associated with the images;
    associating at least some of the images with positions, the positions being estimated from the timing data associated with each respective image, the estimation based at least in part on a distance traveled corresponding to an amount of time represented by the timing data;
    producing a graphical path on a digital map that represents the positions associated with the images;
    recalculating the association of at least some of the estimated positions and at least some of the images based upon user provided data indicating a position of at least one of the images;
    modifying the graphical path based upon the recalculated associations; and
    presenting the modified path.

24. The non-transitory computer readable media of claim 23, wherein the positions associated with the images represent capture locations of the images and the timing data represents the capture time of the images.

25. The non-transitory computer readable media of claim 23, wherein at least one estimated image position is associated with a location on the digital map.

26. The non-transitory computer readable media of claim 23, wherein the data that represents the adjustment to the estimated positions of the images includes another image.

27. The non-transitory computer readable media of claim 23, wherein the data that represents the adjustment to the estimated positions of the images includes an indication of a change in direction.

28. The non-transitory computer readable media of claim 23, wherein the data that represents the adjustment to the estimated positions of the images includes data from a graphical user interface.

29. The non-transitory computer readable media of claim 28, wherein a user-selectable graphical pin provides the data from the graphical user interface.

30. The non-transitory computer readable media of claim 28, wherein the data from the graphical user interface represents a location on the digital map that corresponds to a location associated with another image.

31. The non-transitory computer readable media of claim 23, wherein the data that represents the adjustment to the estimated positions of the images includes an indication that at least one of the images is associated with another location on the digital map.

32. The non-transitory computer readable media of claim 23, wherein user interaction provides at least one of the positions associated with the images.

33. The non-transitory computer readable media of claim 23, wherein a waypoint provides at least one of the positions associated with the images.

* * * * *